United States Patent Office.

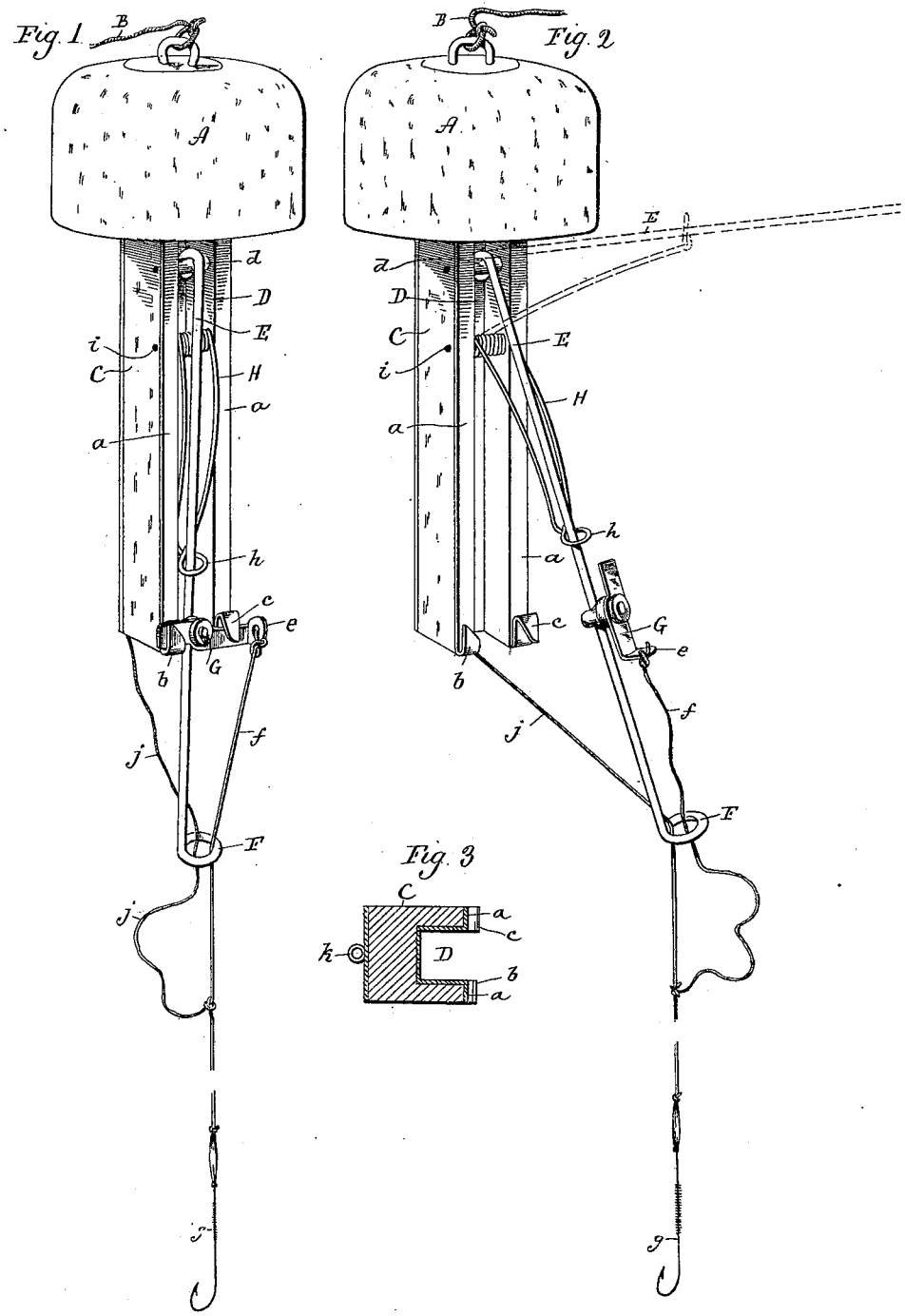

MORRIS ZACK, OF NEW HAVEN, CONNECTICUT.

FISH-TRAP.

SPECIFICATION forming part of Letters Patent No. 619,819, dated February 21, 1899.

Application filed December 9, 1898. Serial No. 698,703. (No model.)

*To all whom it may concern:*

Be it known that I, MORRIS ZACK, of New Haven, in the county of New Haven and State of Connecticut, have invented a new Improvement in Fish-Traps; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a fish-trap constructed in accordance with my invention; Fig. 2, a similar view with the latch tripped and the lever in its open position; Fig. 3, a transverse section of the lower end of the shank.

This invention relates to an improvement in fish-traps, and particularly to such as are employed in connection with an ordinary line and which will, when a slight pull is made upon the hook, release a spring which will suddenly twitch the hook upward, so as to cause the hook to more certainly catch the fish, the object of the invention being a simple arrangement of the spring in connection with a float; and it consists in the construction as hereinafter described, and particularly recited in the claims.

Preferably I shall combine my trap with a float, which, as herein shown, consists of a head A, of cork or other buoyant material, to the top of which the ordinary line B is attached, and from this head depends a long shank C, having in one face or side a longitudinal groove D. This groove is preferably lined with metal, the edges $a$ of which overlap the surface of the shank, and at the lower end these edges are cut to form on one side an upturned hook $b$ and at the opposite side a downwardly-turned hook $c$. In the upper end of the groove is a transverse pivot $d$, on which is suspended a lever E. This lever is longer than the length of the shank and is formed at its outer end with an eye F. Secured to the lever is a latch G, in position so that when turned transversely one end will rest in the hook $b$ and the other in the hook $c$, and the end of the latch beyond the hook $c$ is formed with an ear $e$, to which a line $f$ is attached, which line leads through the eye F to the fish-hook $g$. Within the groove or chamber in the shank, below the pivot $d$, is pivoted a spring H, the tendency of which is to throw the lever E outward. As herein shown, this is a wire spring doubled at its center to form an eye $h$, which surrounds the lever, and the two ends of the wire turned around the pivot $i$. Secured to an eye $k$ at the lower end of the shank is a line $j$, which extends downward through the eye F and is secured to the line $f$ above the hook, the length of the said line $j$ being such that when the latch is engaged with the hooks on the shank, as shown in Fig. 1, the line $j$ will be slack; but when the latch is disengaged and the lever E thrown outward the strain from the hook will come upon the end of the shank, as shown in Fig. 2.

The operation of the device is as follows: The lever E will be depressed so as to stand in the recess or chamber D in the shank, in which position it depresses the spring H, and in this position is locked by having the ends of the latch G engaged, respectively, with the hooks $b$ $c$ at the end of the shank. In this position a draft upon the fish-hook at the lower end of the line will trip the latch, so as to disengage its ends from the hooks, thus releasing the lever, which under the action of the spring H will fly upward, as shown in broken lines, Fig. 2, and give a sudden twitch upon the fish-hook, so as to more certainly catch the fish. If then the device be drawn upward, the strain of the hook comes upon the line $j$, which being attached directly to the lower end of the shank will be drawn upward with the device in the same manner as though an ordinary float were employed.

I am aware that spring devices have been arranged in connection with fish-hooks for giving the hook a sudden jerk when the fish first takes it, and therefore do not wish to be understood as claiming, broadly, such as my invention; but, Having fully described my invention, what I claim as new, and desire to secure by Letters Patent, is—

1. The combination with a float having a longitudinal groove, and provided at its lower end with oppositely-turned hooks, of a lever pivotally hung in said groove, and formed at its outer end with an eye, a latch pivotally connected with said lever, and adapted to engage with the hooks at the ends of the shank, and a spring also connected with said shank, and tending to force the said lever outward, substantially as described.

2. A fish-trap comprising a float having a depending shank, a groove in said shank, a lining therefor, the edges of which overlap the edges of the shank and form at the lower end thereof two oppositely-turned hooks, a lever pivotally mounted at the upper end of said shank extending below the same, and formed at its outer end with an eye, a latch pivotally secured to said lever, and adapted for engagement with the hooks at the lower end of the shank, a spring secured to said shank and engaging with said lever which it is adapted to throw outward, a line secured to said latch, and a line secured to the end of the shank, said two lines extending through the eye at the end of the lever and connected together and supporting a fish-hook, substantially as described.

In testimony whereof I have signed this specification in the presence of two subscribing witnesses.

MORRIS ZACK.

Witnesses:
LILLIAN D. KELSEY,
FRED. C. EARLE.